United States Patent
Singh et al.

(10) Patent No.: US 11,925,145 B2
(45) Date of Patent: Mar. 12, 2024

(54) THRESHING SPINE

(71) Applicant: DEERE & COMPANY, Moline, IL (US)

(72) Inventors: Manish Singh, Pune (IN); Michael T. Meschke, Geneseo, IL (US); Mark L. Mattson, East Moline, IL (US); Corey A. Noord, Atkinson, IL (US)

(73) Assignee: DEERE & COMPANY, Moline, IL (US)

( * ) Notice: Subject to any disclaimer, the term of this patent is extended or adjusted under 35 U.S.C. 154(b) by 279 days.

(21) Appl. No.: 16/735,111

(22) Filed: Jan. 6, 2020

(65) Prior Publication Data
US 2021/0204480 A1 Jul. 8, 2021

(51) Int. Cl.
| | | |
|---|---|---|
| A01F 7/06 | (2006.01) | |
| A01F 12/18 | (2006.01) | |
| A01F 12/20 | (2006.01) | |
| A01F 12/22 | (2006.01) | |

(52) U.S. Cl.
CPC .............. *A01F 12/185* (2013.01); *A01F 7/06* (2013.01); *A01F 12/181* (2013.01); *A01F 12/20* (2013.01); *A01F 12/22* (2013.01)

(58) Field of Classification Search
CPC . A01F 7/00–7/70; A01F 12/18; A01F 12/181; A01F 12/185; A01F 12/20; A01F 12/22; A01F 12/24; A01F 12/26; A01F 12/28; A01F 12/00–12/60; A01F 2012/188; A01F 7/06; A01F 7/02
See application file for complete search history.

(56) References Cited

U.S. PATENT DOCUMENTS

| | | | | |
|---|---|---|---|---|
| 217,039 | A | * 7/1879 | Name | A01D 33/06 460/121 |
| 298,196 | A | * 5/1884 | Name | A01F 11/04 460/107 |
| 2,321,019 | A | * 6/1943 | Dray | A01F 12/20 460/71 |
| 3,664,100 | A | 5/1972 | Rowland-Hill | |
| 3,848,609 | A | 11/1974 | Mortier et al. | |
| 3,995,645 | A | 12/1976 | Rowland-Hill | |
| 4,117,849 | A | * 10/1978 | Pakosh | A01D 41/00 460/66 |
| 4,136,704 | A | 1/1979 | Dyke | |
| 4,149,360 | A | * 4/1979 | Rowland-Hill | A01F 7/06 460/67 |
| 4,249,543 | A | 2/1981 | Rowland-Hill | |

(Continued)

FOREIGN PATENT DOCUMENTS

| | | | |
|---|---|---|---|
| DE | 4023894 C2 * | 9/1994 | ........... A01F 12/185 |
| EP | 2200914 B1 * | 3/2012 | ............. A01F 12/46 |

(Continued)

*Primary Examiner* — Thomas B Will
*Assistant Examiner* — Madeline I Runco
(74) *Attorney, Agent, or Firm* — Taft Stettinius & Hollister LLP; Stephen F. Rost

(57) ABSTRACT

A harvesting machine that has a first rotor rotationally coupled to a chassis, a second rotor rotationally coupled to the chassis, and a spine separating the first rotor from the second rotor. Wherein the spine has threshing inserts coupled thereto to facilitate threshing of crop processed by the first and second rotors.

19 Claims, 8 Drawing Sheets

(56) References Cited

U.S. PATENT DOCUMENTS

| | | | | |
|---|---|---|---|---|
| 4,258,726 A * | 3/1981 | Glaser | ............... | A01F 12/24 |
| | | | | 460/109 |
| 4,498,483 A * | 2/1985 | Dammann | ............... | A01F 12/18 |
| | | | | 460/69 |
| 5,556,337 A * | 9/1996 | Tophinke | ............... | A01F 7/06 |
| | | | | 460/70 |
| 6,500,063 B1 | 12/2002 | Gryspeerdt | | |
| 7,028,457 B2 * | 4/2006 | Schmidt | ............... | A01F 12/52 |
| | | | | 56/16.6 |
| 7,207,882 B2 * | 4/2007 | Schmidt | ............... | A01F 12/52 |
| | | | | 460/46 |
| 7,473,170 B2 * | 1/2009 | McKee | ............... | A01F 7/067 |
| | | | | 460/109 |
| 8,628,390 B2 * | 1/2014 | Baltz | ............... | A01F 12/24 |
| | | | | 460/109 |
| 8,829,389 B2 * | 9/2014 | Flickinger | ............... | B23K 26/38 |
| | | | | 460/109 |
| 8,926,415 B2 * | 1/2015 | Farley | ............... | A01F 7/067 |
| | | | | 460/107 |
| 9,668,424 B2 * | 6/2017 | Bojsen | ............... | A01F 7/067 |
| 9,681,607 B2 * | 6/2017 | Bojsen | ............... | A01F 7/06 |
| 9,820,442 B2 * | 11/2017 | Matousek | ............... | A01F 7/067 |
| 10,143,141 B2 * | 12/2018 | De Witte | ............... | A01F 7/04 |
| 10,238,038 B2 * | 3/2019 | Matousek | ............... | A01F 12/181 |
| 10,602,667 B2 * | 3/2020 | Ritter | ............... | A01F 12/26 |
| 2018/0160627 A1 * | 6/2018 | Kemmerer | ............... | A01F 7/062 |
| 2018/0359926 A1 | 12/2018 | Estes | | |

FOREIGN PATENT DOCUMENTS

| | | | | |
|---|---|---|---|---|
| EP | 3412138 A1 * | 12/2018 | ............... | A01F 12/26 |
| RU | 196028 U1 * | 2/2020 | ............... | A01D 41/12 |
| WO | WO-2017193529 A1 * | 11/2017 | ............... | A01F 7/04 |

* cited by examiner

THRESHING SPINE

FIELD OF THE DISCLOSURE

The present disclosure relates generally to a spine in a dual rotor threshing system and more specifically to a spine that accommodates threshing inserts thereon.

BACKGROUND

Many work machines, and in particular work machines designed to harvest a crop, utilize a rotating assembly to separate grain or the like from the remaining plant debris such as leaves, stalks, and stems. The rotating assembly of a dual rotor threshing systems utilizes two rotors to facilitate separating grain from a harvested crop. The dual rotor threshing system typically has two rotor assemblies. Each rotor assembly is often formed from a substantially hollow drum with corresponding rotors that rotate therein. As the rotors rotates, any crop and debris positioned within the hollow drum is agitated and moved axially towards the rear of the rotating assembly which often has a separating section. As the rotor separates the grain from the remaining debris, the grain falls through grates or the like along a lower portion of the rotating assembly. Once the grain is separated, it is further processed and temporarily stored in a tank of the work machine. The rotating assembly often has a spine running between the two rotors. The spine provides a structural support to the rotor assembly while separating the two rotors.

SUMMARY

One embodiment is a harvesting machine that has a first rotor rotationally coupled to a chassis, a second rotor rotationally coupled to the chassis, and a spine separating the first rotor from the second rotor. Wherein the spine has threshing inserts coupled thereto to facilitate threshing of crop processed by the first and second rotors.

In one example of this embodiment, the spine has a first curved profile directed towards the first rotor and a second curved profile directed towards the second rotor. In one aspect of this example, the threshing inserts are coupled to the spine along the first curved profile and the second curved profile.

Another example of this embodiment is a concave coupled to the spine. In yet another example, the first and second rotor each have a threshing section that extends partially the length of the corresponding first and second rotor, wherein the threshing inserts are positioned along the threshing section. In one aspect of this example, the threshing inserts are only positioned along the threshing section.

In yet another example of this embodiment, the threshing inserts are permanently coupled to the spine. In another example, the threshing inserts are removeably coupled to the spine. In one aspect of this example, the spine has a plurality of coupler receivers formed therein that selectively receive fasteners to couple the threshing inserts to the spine. In part of this aspect, the coupler receivers are spaced to couple the threshing inserts thereto in a plurality of spacing orientations.

In another example of this embodiment, the surface of the spine adjacent to the threshing inserts is substantially solid. In yet another example, the spine spans about thirty percent of the perimeter of the first rotor and of the second rotor.

Another embodiment of this disclosure is a spine for a dual rotor harvesting machine. The spine has a first surface of the spine directed towards a first rotor, a second surface of the spine directed towards a second rotor, and at least one threshing insert positioned on the first surface and at least one threshing insert positioned on the second surface. Further, the threshing inserts are extensions from the corresponding first and second surface that assist the threshing process of the first and second rotor.

In one example of this embodiment, the first surface and the second surface are positioned at least partially between the first and second rotor. In another example, the first and second surface have an arced profile. In yet another example, the at least one threshing insert is removeably coupled to the surface wherein the number and spacing of the threshing inserts on each of the first and second surface is variable.

Yet another embodiment of this disclosure is a method for manufacturing a harvesting machine. The method includes providing a chassis, a first rotor, a second rotor, a spine, and at least one threshing insert, rotationally coupling the first rotor to the chassis along a first axis, rotationally coupling the second rotor to the chassis along a second axis, coupling the spine to the chassis so at least a portion of the spine is positioned between the first axis and the second axis, and coupling at least one of the threshing inserts to the spine. The threshing insert is configured to aid in a threshing process of the first or second rotor.

One example of this embodiment includes coupling at least one concave to the spine. Yet another example includes removeably coupling the at least one threshing insert to the spine with a fastener. Another embodiment includes coupling more than one threshing insert to the spine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
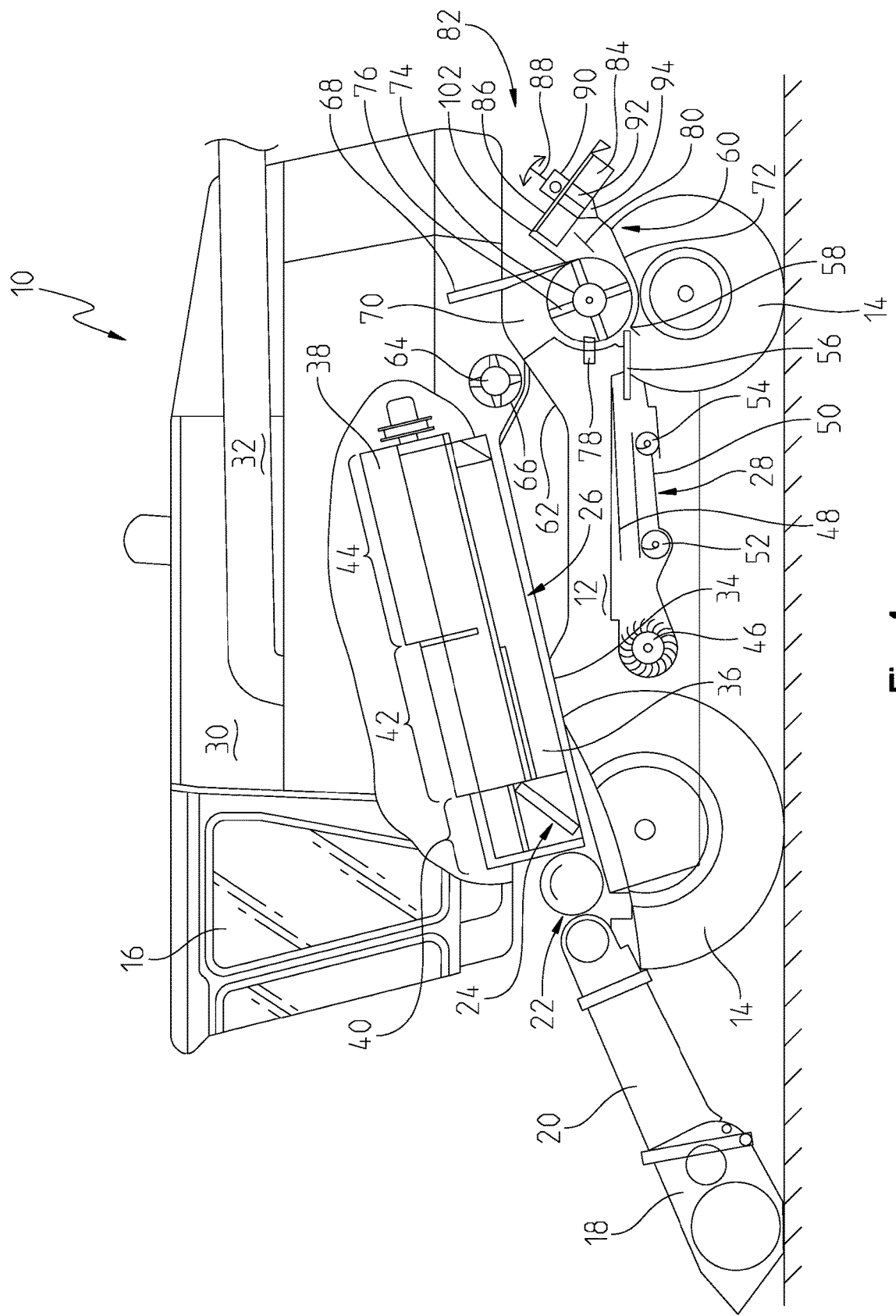
FIG. 1 is a schematic side view of a harvesting machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of a harvester or agricultural combine 10 is shown with a chassis or frame 12 with one or more ground engaging mechanism such as wheels 14 which are in contact with the underlying surface or ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls for controlling the operation of the combine 10. A cutting head 18 is disposed at a forward end of the combine 10 and is used in order to harvest crop such as corn and to conduct it to a slope conveyor 20. The harvested crop is conducted by a guide drum 22 from the slope conveyor 20. The guide drum 22 guides the harvested crop through an inlet transition section 24 to an axial harvested crop processing arrangement 26, as shown in FIG. 1.

The harvested crop processing arrangement 26 may include a housing 34 and two rotor assemblies 36 arranged therein. The rotor assemblies 36 each include a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drums 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26.

Corn, chaff, and the like that fall through a thresher basket associated with the threshing section 42 and through a separating grate associated with the separating section 44 may be directed to a clean crop routing assembly 28 with a blower 46 and sieves 48, 50 with louvers. The sieves 48, 50 can be oscillated in a fore-and-aft direction. The clean crop routing assembly 28 removes the chaff and guides the clean corn over a screw conveyor 52 to an elevator for clean corn. The elevator for clean corn deposits the clean corn in a corn tank 30, as shown in FIG. 1. The clean corn in the corn tank 30 can be unloaded by means of an unloading screw conveyor 32 to a corn wagon, trailer, or truck. Harvested crop remaining at the lower end of the lower sieve 50 is again transported to the harvested crop processing arrangement 26 by a screw conveyor 54 and an overhead conveyor. The harvested crop residue delivered at the upper end of the upper sieve 48 that consist essentially of chaff and small straw particles may be conveyed by means of an oscillating sheet conveyor 56 to the rear and to a lower inlet 58 of a crop debris routing assembly 60.

The aforementioned blower 46 produces an air flow that carries much of the chaff and small particles to the rear of the combine and to the crop debris routing assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and Material Other than Grain (hereinafter "MOG") is directed through the clean crop routing assembly 28. A wall 68 is located to the rear of the ejection drum 64. The wall 68 guides the straw into an upper inlet 70 of the crop debris routing assembly 60.

The crop debris routing assembly 60 may include a housing 72 (i.e., chopper housing) with a rotor 74 arranged therein that can rotate in a counter clockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the crop debris routing assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the crop debris routing assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (with-out cone 94) may be equal to the height of the impeller blades 84. The cross section of the body 92 and the cone 94 may be circular, although it could also have a multifaceted shape.

While FIG. 1 illustrates one type of combine 10, the teachings of this disclosure are not limited to the specific combine shown and described herein with reference to FIG. 1. Rather, the teachings of this disclosure may be applied to any type of harvesting machine that utilizes more than one axial crop harvesting arrangement. More specifically, any type of crop harvesting machine that has a spine separating axial crop harvesting arrangements may utilize the teachings discussed herein and this disclosure is intended to apply to any such machine. The embodiment of FIG. 1 is meant only as one non-exclusive example of a combine 10.

Figure 2:
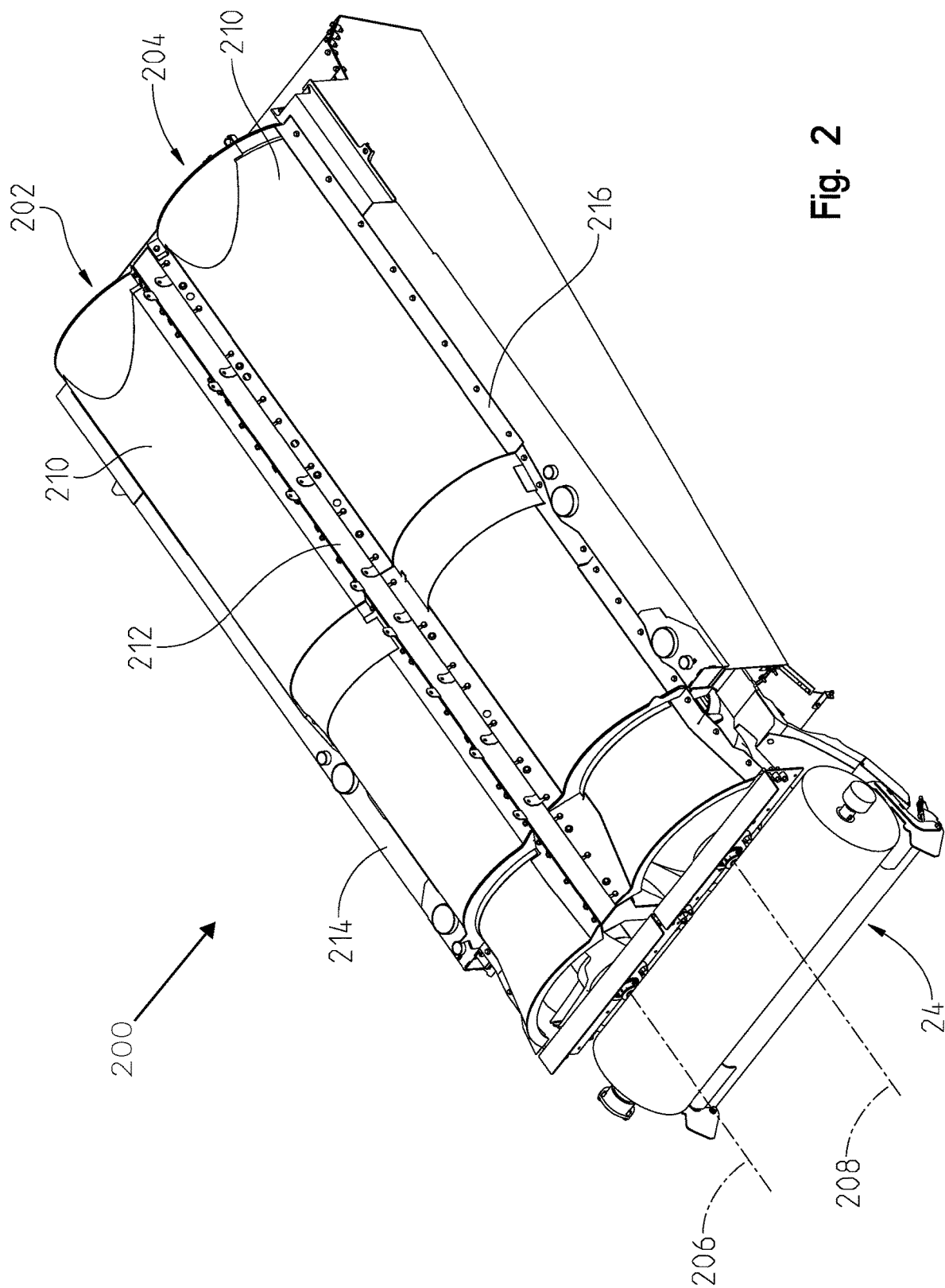
FIG. 2 is an elevated perspective view of a dual rotor threshing assembly.

Referring now to FIG. 2, one embodiment of a dual rotor threshing assembly 200 is illustrated. The dual rotor threshing assembly 200 may include a first rotor assembly 202 and a second rotor assembly 204 having rotors therein rotationally coupled to the chassis 12 of the combine 10. The rotors of the first and second rotor assemblies 202, 204 may be rotationally coupled to the chassis 12 utilizing any number of brackets or the like and may not be rotationally coupled directly to the chassis 12. Further, the rotors may be rotationally coupled to the chassis 12 to rotate about corresponding first and second axes 206, 208. In this configuration, harvested crop may enter the first or second rotor assembly 202, 204 through the inlet 24. Further, the combine 10 may selectively rotate the rotors of the rotor assemblies 202, 204 via a mechanical linkage to a prime mover, a hydraulic motor, an electric motor, a pneumatic motor, or any other known system for rotating an assembly.

Figure 4:
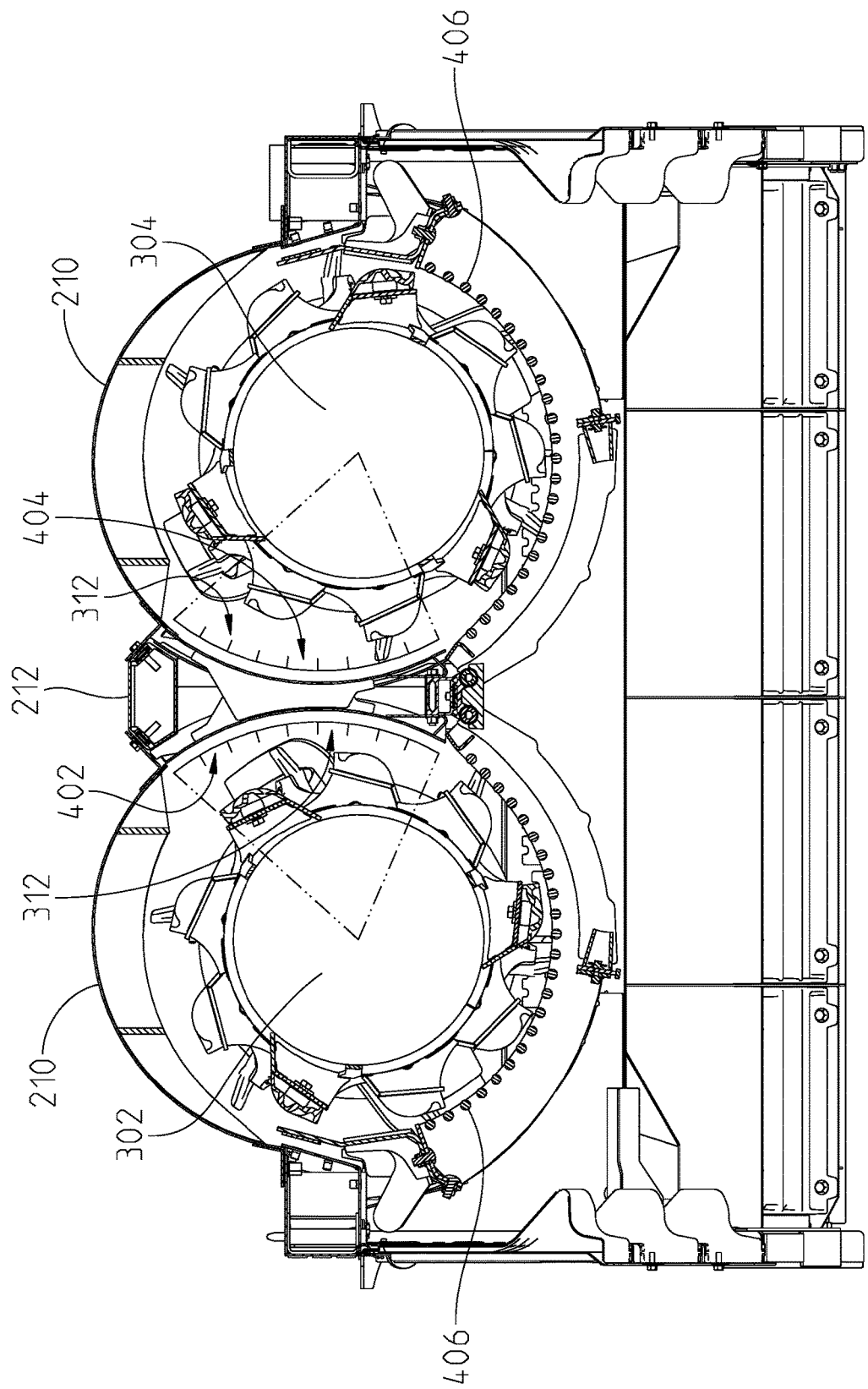
FIG. 4 is a front section view of the dual rotor threshing assembly of FIG. 2.

The first and second rotor assemblies 202, 204 may each have one or more cover element 210 along an upper portion of the corresponding assembly 202, 204. The cover elements 210 for the first rotor assembly 202 may extend from a first side member 214 to spine 212. Similarly, the cover elements 210 for the second rotor assembly 204 may extend from the spine 212 to a second side member 214. Each cover element 210 may have an arc-shaped profile to partially form a cylindrical cavity for corresponding first and second rotors as illustrated in FIG. 4. Further, the spine 212 and first and second side member 214, 216 may be part of, or otherwise coupled to, the chassis 12.

Figure 3:
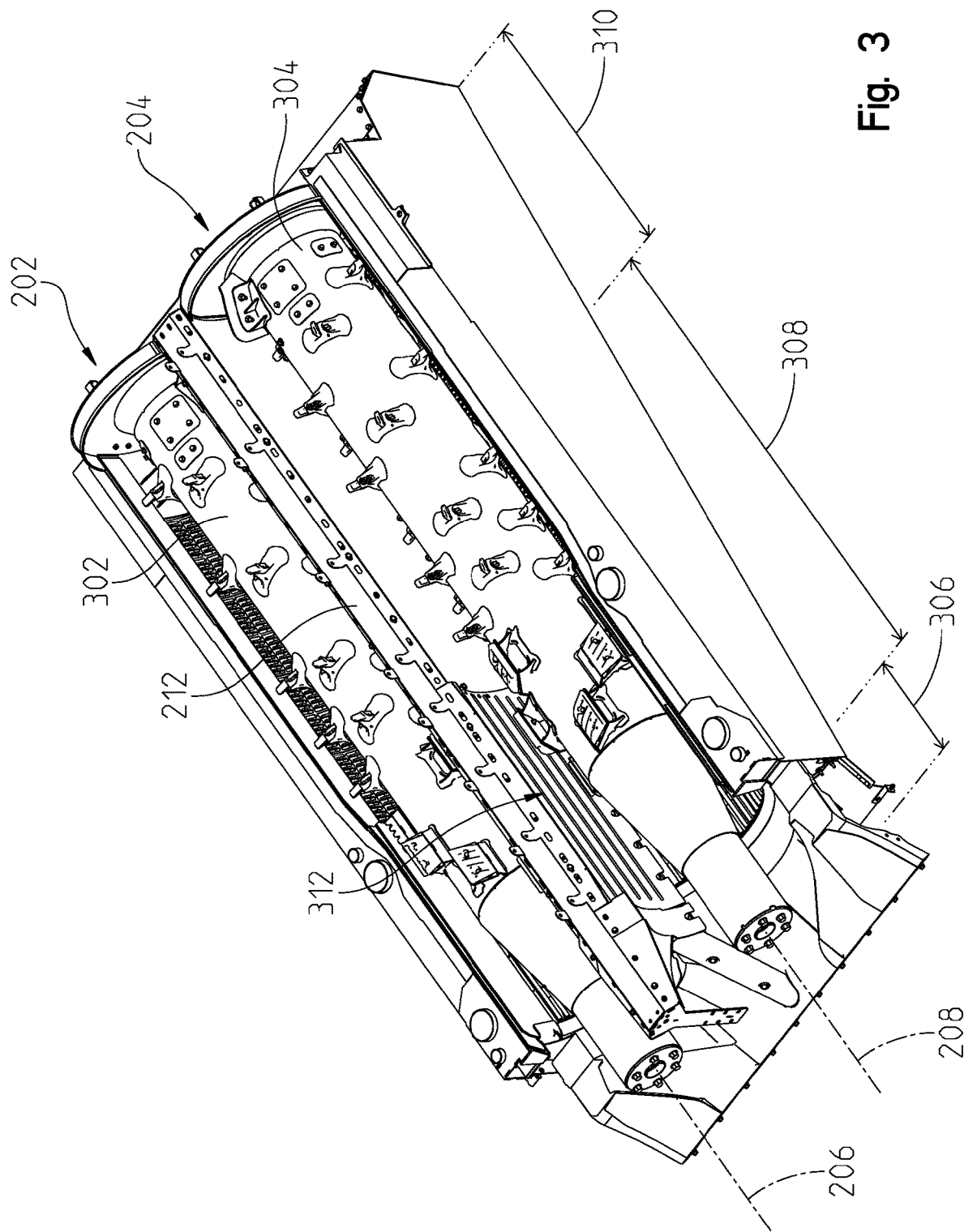
FIG. 3 is an elevated perspective view of the dual rotor threshing assembly of FIG. 2 with cover elements removed.

Referring now to FIG. 3, the dual rotor threshing assembly 200 is illustrated with the cover elements 210 removed. More specifically, FIG. 3 illustrates a first rotor 302 as part of the first rotor assembly 202 and a second rotor 304 as part of the second rotor assembly 204. The rotors 302, 304 may be powered to rotate about the corresponding axes 206, 208 to assist with separating grain from MOG among other things. More specifically, the rotors 302, 304 may rotate within cylindrical cavities defined in part by the cover elements 210, spine 212, corresponding first or second side member 214, 216, and corresponding concaves 406 (see FIG. 4). As the rotors 302, 304 rotate within their corresponding cylindrical cavities, harvested crop is agitated and grain and MOG fall through the concaves 406 to be further processed and separated.

Each of the rotor assemblies 202, 204 may have a charging section 306, a threshing section 308, and a separating section 310. The charging section 306 is arranged at the front end of each rotor 302, 304. The threshing section 308 and the separating section 310 are located downstream in the longitudinal direction and to the rear of the charging section 306 with the threshing section 308 being between the charging section 308 and the separating section 310. The rotors 302, 304 may be in the form of a truncated cone located in the charging section 306. The threshing section 308 may include a forward section in the form of a truncated cone and a cylindrical rear section. The cylindrical separating section 310 is located at the rear or end of each rotor 302, 304.

The spine 212 may have one or more threshing insert 312 positioned thereon. Threshing inserts 312 may be positioned on two different portions of the spine 212. More specifically, threshing inserts 312 may be positioned on a portion of the spine 212 facing the first rotor 302 and threshing inserts 312 may be positioned on a portion of the spine 212 facing the second rotor 304. The threshing inserts 312 may be extensions from the corresponding surface of the spine 212 that extend radially inward towards the corresponding rotor 302, 304. In one aspect of this disclosure, the threshing inserts 312 may further agitate any crop material in the corresponding rotor assembly 202, 204 as the corresponding rotors 302, 304 rotate. By further agitating the crop, the threshing inserts 312 may increase the efficiency and speed that the grain is separated from MOG. This increase in efficiency and speed may allow the combine 10 to harvest crop more efficiently and at faster rates than prior designs.

The threshing inserts 312 may be positioned along any part of the spine 212. More specifically, threshing inserts 312 may be positioned along the arc-shaped portion of the spine 212 to ensure the threshing inserts 312 agitate crop as the rotors 302, 304 rotate. Further, the threshing inserts 312 may be positioned along the spine 212 in the charging section 306, the threshing section 308, and the separating section 310. However, in one non-exclusive embodiment the threshing inserts 312 may be positioned only along the threshing section 308 of the threshing assembly 200.

Referring now to FIG. 4, a section view of the threshing assembly 200 is illustrated along the threshing section 308. More specifically, the cylindrical cavities within which the rotors 302, 304 are located are more clearly illustrated. The cylindrical cavities may be defined in part by the cover elements 210 coupled to the spine 212 on one end and the corresponding first or second side member 214, 216 on the other. The spine 212 may have a first surface 402 and a second surface 404 that have first and second curved profiles that partially define the corresponding first and second cylindrical cavities. Further, the concaves 406 may extend between the spine 212 and the corresponding first and second side member 214, 216. In this configuration, each cylindrical cavity within which the corresponding rotor 302, 304 is positioned is defined by a combination of the cover elements 210, spine 212, corresponding first or second side member 214, 216, and concaves 406.

Figure 5:
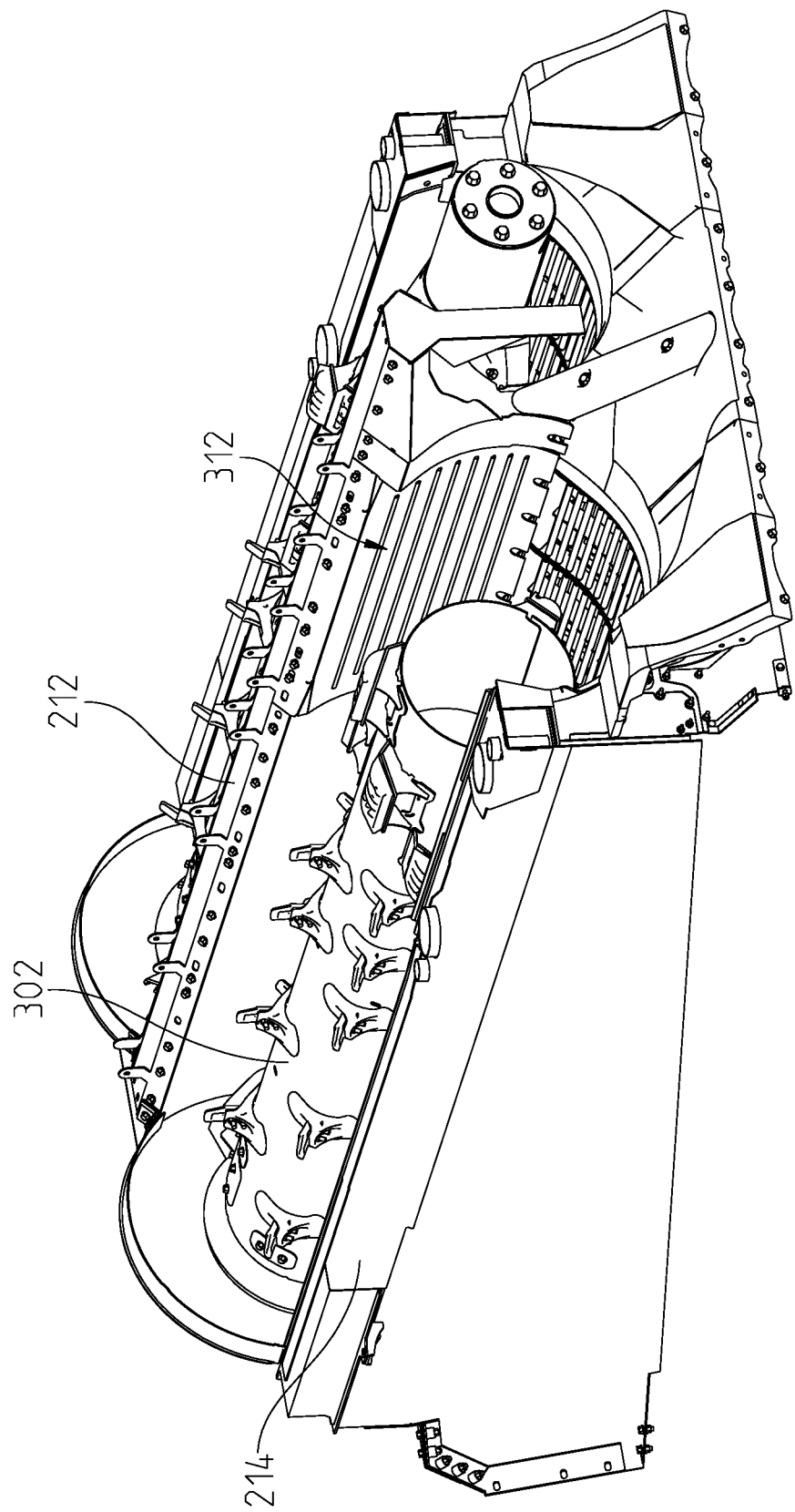
FIG. 5 is an elevated perspective view of portions of the dual rotor threshing assembly of FIG. 2.

In one aspect of this disclosure, the spine 212 may define an inner surface of the cylindrical cavities that extends about 30% of the overall perimeter of the corresponding wall of the cylindrical cavity. In other words, the cover elements 210 and concaves 406 may define a majority of the surrounding wall of the cylindrical cavities within which the rotors 302, 304 are positioned, but the spine 212 may at least partially define a portion of the cylindrical cavity wall. More specifically, FIG. 5 illustrates the rotor assembly 200 with the charging section 306 and a portion of the threshing section 308 of the first rotor 302 removed. As illustrated in FIG. 5, the spine 212 may define a substantially solid surface that defines a portion of the cylindrical wall adjacent to the rotors 302, 304. Further, the threshing inserts 312 may be coupled to the solid surface of the spine 212 to extend radially towards the corresponding rotor 302, 304 to thereby further agitate crop as it passes thereby during a harvesting operation.

Figure 6:
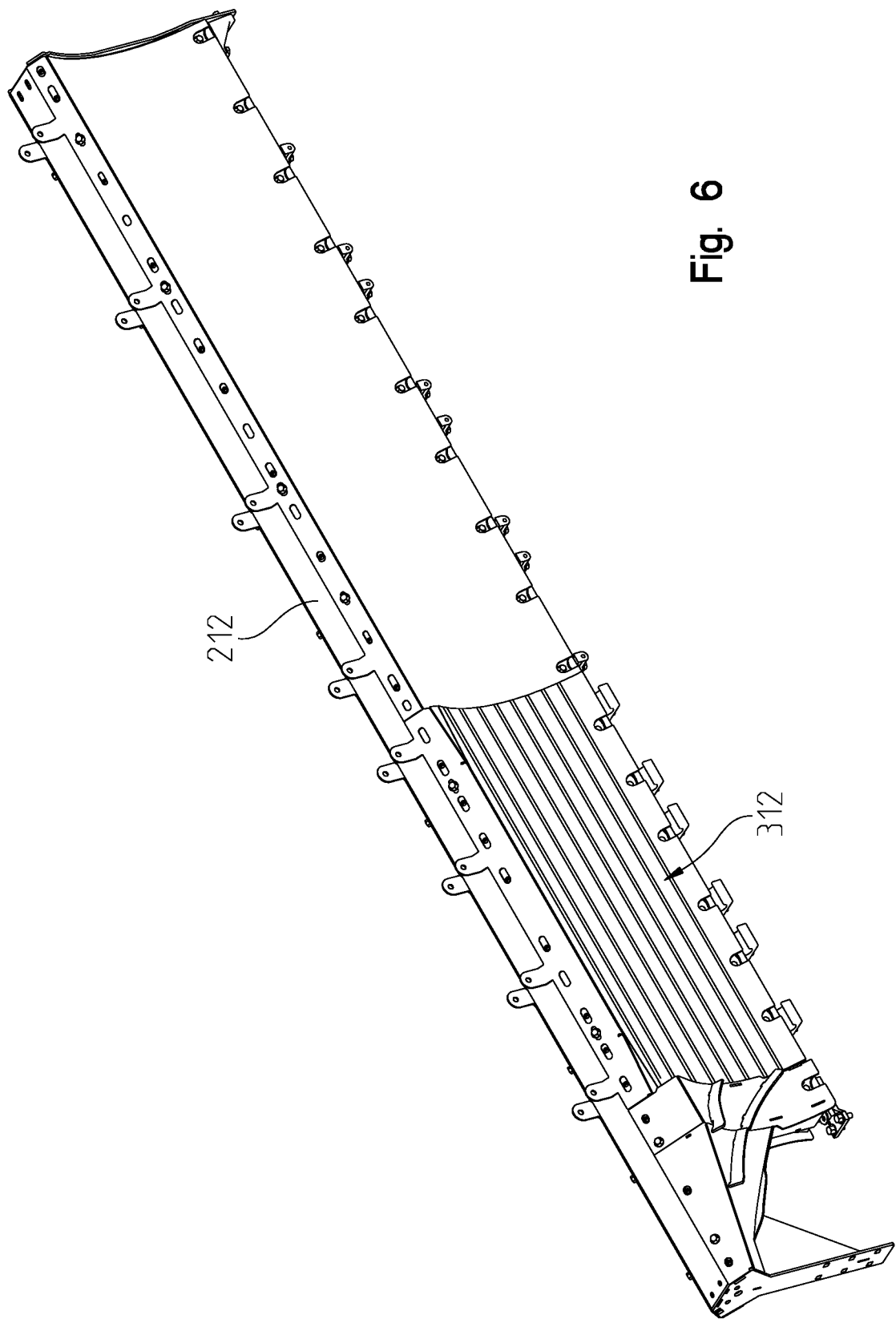
FIG. 6 is an elevated perspective view of a spine of the dual rotor threshing assembly of FIG. 2.
Figure 8A:
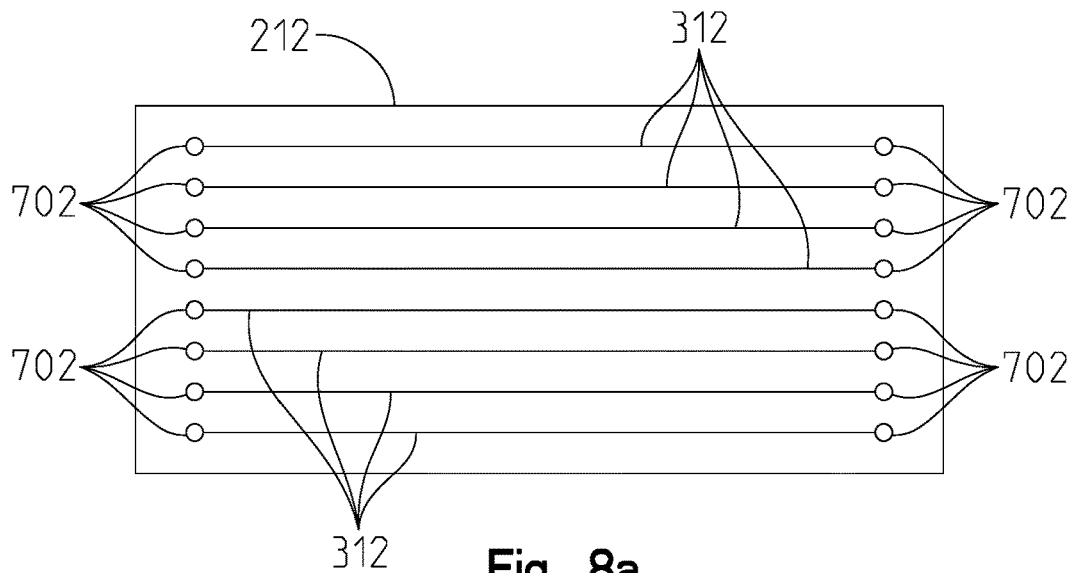
FIGS. 8*a*-8*c* are schematic views of different embodiments of threshing inserts.
Figure 8B:
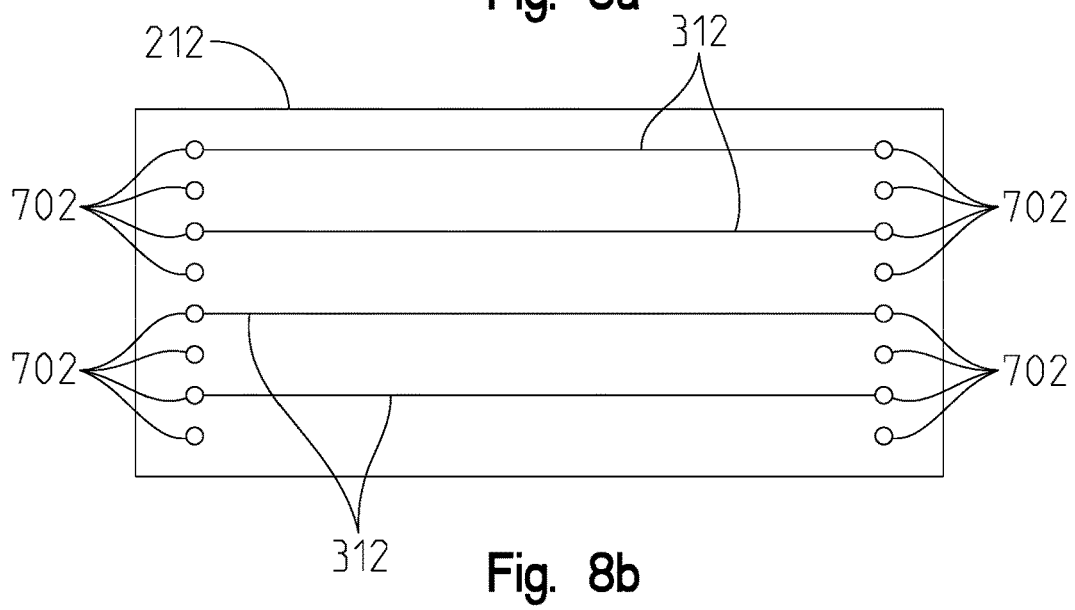
Figure 8C:
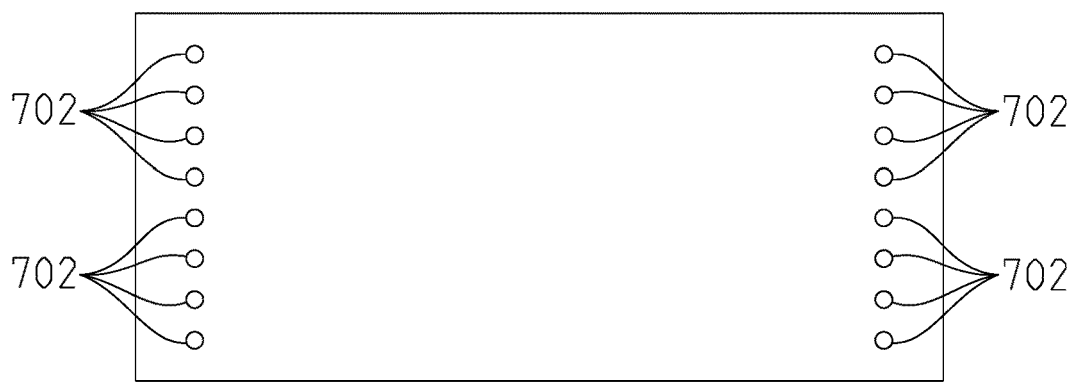

In FIG. 6, the spine 212 is illustrated isolated from the rotors 302, 304 and chassis 12. More specifically, the threshing inserts 312 are illustrated coupled to the radially inner surface of the spine 212. The threshing inserts 312 may be removeably coupled to the inner surface in different patterns to accommodate different threshing needs. For example, in the embodiment of FIG. 8a there may be eight or more threshing inserts 312 coupled to the spine 212 along each of the first and second rotors 302, 304. Alternatively, in another embodiment illustrated in FIG. 8b every other threshing insert 312 may be removed and only four threshing inserts 312 may be coupled to the spine 212 along each of the first and second rotors 302, 304. Further still, in the embodiment of FIG. 8c there may be no threshing inserts 312 coupled to the spine 212.

While specific examples of threshing inserts are discussed herein, this disclosure contemplates having more than eight threshing inserts and fewer than four as well. More specifically, any number of threshing inserts 312 may be used herein to accommodate the needs caused by different harvesting conditions. Further still, the first and second rotor assembly 202, 204 may have a different configuration of threshing inserts 312 along the corresponding rotors 302, 304. In yet another embodiment, the threshing inserts 312 may not be evenly spaced from one another as they are in FIGS. 8a and 8b. Accordingly, any configuration of threshing inserts 312 may be coupled to the spine 212 to accommodate different crop conditions.

Figure 7:
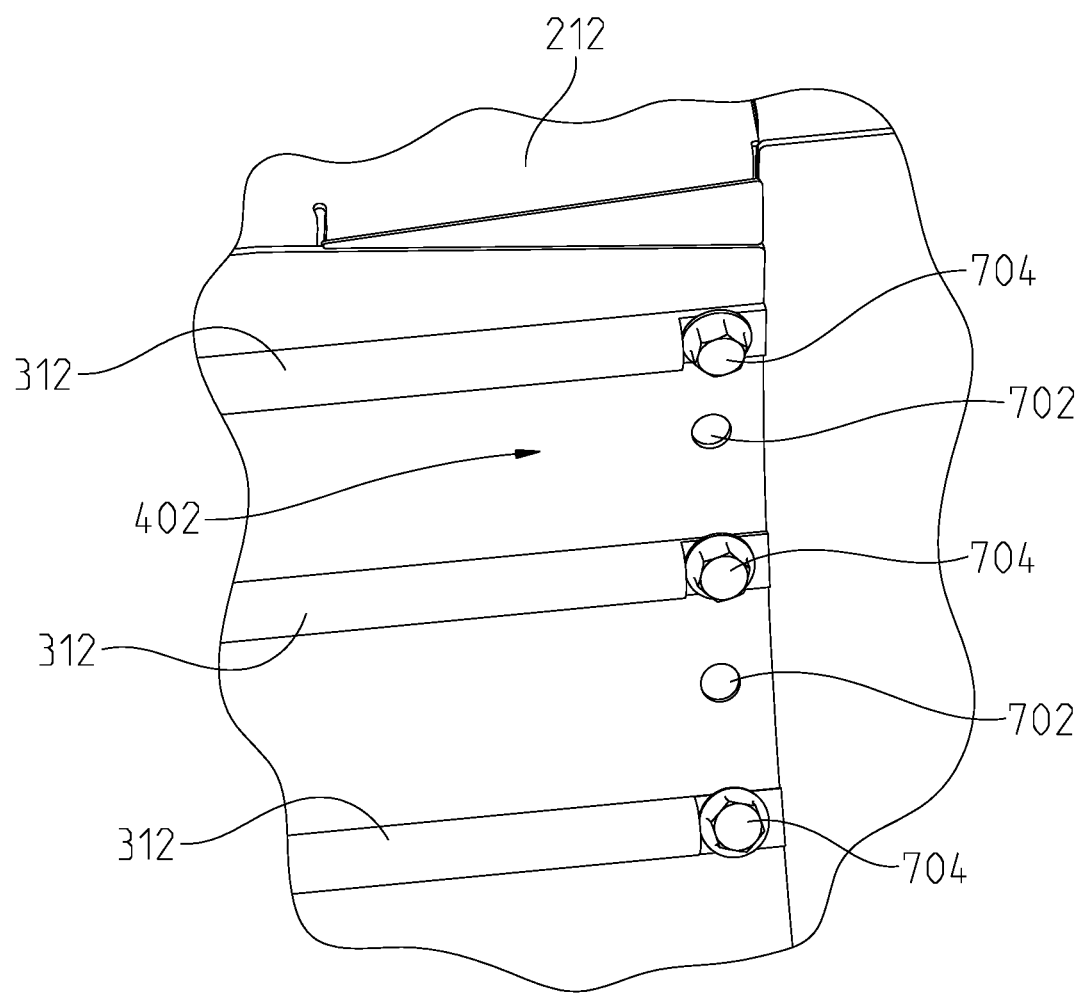
FIG. 7 is a detailed view of one embodiment of a threshing insert assembly.

Referring now to FIG. 7, one non-exclusive example of the threshing inserts 312 is illustrated. More specifically, each threshing insert 312 may be coupleable to the spine 212 through one or more coupler receiver 702. The coupler receivers 702 may selectively receive fasteners 704 or the like therein to selectively couple a threshing insert 312 to the spine 212. In this configuration, the spine 212 may have a plurality of pairs of coupler receivers 702 spaced from one another. One or more threshing insert 312 may be selectively coupled to one or more of the coupler receivers 702 based on the harvesting conditions. For example, in a first harvesting condition a threshing insert 312 may be coupled to each pair of coupler receivers 702 to maximize the crop agitation along the spine 212. Alternatively, in a second harvesting condition only every other pair of coupler receiver 702 may have a threshing insert 312 coupled thereto. Further still, in a third harvesting condition no threshing inserts 312 may be coupled to the spine 212 along the pairs of coupler receivers 702.

In one aspect of this disclosure, the spine 212 may extend between the first and second axes 206, 208 to provide structural support to the threshing assembly 200. The spine 212 may have a first curved profile directed towards the first rotor 302 and second curved profile directed towards the second rotor 304. The threshing inserts 312 can have any cross-section capable of agitating crop. In one non-exclusive example, the threshing inserts 312 may be formed from key stock or the like and may have a rectangular or round cross-section. However, other shaped cross-sections are also considered herein. Further, in one aspect of this disclosure the threshing inserts 312 may extend substantially parallel to the corresponding axes 206, 208. However, in other embodiment the threshing inserts are offset relative thereto.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A harvesting machine, comprising:
a first rotor rotationally coupled to a chassis about a first axis;
a first cover element and a first concave positioned partially around the first rotor to partially define a first cavity for the first rotor;
a second rotor rotationally coupled to the chassis about a second axis;
a second cover element and a second concave positioned partially around the second rotor to partially define a second cavity for the second rotor; and
a spine separating the first rotor from the second rotor and having a first surface and a second surface, the first and second surface being solid, the spine providing structural support with the chassis;
wherein, the spine is coupled to the first cover element and the first concave to partially define the first cavity and the spine is coupled to the second cover element and the second concave to partially define the second cavity;
wherein the spine has threshing inserts coupled directly to the first surface and the second surface to facilitate threshing of crop processed by the first and second rotors;
wherein each of the threshing inserts extend parallel with the first and second axis along a threshing section of the spine.

2. The harvesting machine of claim 1, wherein the first surface of the spine has a first curved profile directed towards the first rotor and the second surface of the spine has a second curved profile directed towards the second rotor.

3. The harvesting machine of claim 2, further wherein the threshing inserts are coupled to the spine along the first curved profile and the second curved profile.

4. The harvesting machine of claim 1, further wherein the threshing section extends partially the length of the corresponding first and second rotor.

5. The harvesting machine of claim 4, further wherein the threshing inserts are only positioned along the threshing section.

6. The harvesting machine of claim 1, further wherein the threshing inserts are permanently coupled to the spine.

7. The harvesting machine of claim 1, further wherein the threshing inserts are removeably coupled to the spine.

8. The harvesting machine of claim 7, further wherein the spine has a plurality of coupler receivers formed therein that selectively receive fasteners to couple the threshing inserts to the spine.

9. The harvesting machine of claim 8, further wherein the coupler receivers are spaced to couple the threshing inserts thereto in a plurality of spacing orientations.

10. The harvesting machine of claim 1, further wherein the spine spans about thirty percent of a circumference of the first rotor and of the second rotor.

11. A spine for providing structural support for a dual rotor harvesting machine, comprising:
a first surface of the spine that is solid and directed towards a first rotor configured to rotate about a first axis;
a second surface of the spine that is solid and directed towards a second rotor configured to rotate about a second axis; and
at least one threshing insert positioned directly on the first surface and extending parallel with the first axis along a threshing section of the spine and at least one threshing insert positioned directly on the second surface and extending parallel with the second axis along the threshing section of the spine;
wherein, the threshing inserts are extensions from the corresponding first and second surface that assist the threshing process of the first and second rotor;
wherein, the spine is coupled to a first cover element and a first concave positioned partially around the first rotor to partially define a first cavity for the first rotor and the spine is coupled to a second cover element and a second concave to partially define a second cavity for the second rotor.

12. The spine of claim 11, further wherein the first surface and the second surface are positioned at least partially between the first and second rotor.

13. The spine of claim 11, further wherein the first and second surface have an arced profile.

14. The spine of claim 11, further wherein the at least one threshing insert is removeably coupled to the first and second surface wherein the number and spacing of the threshing inserts on each of the first and second surface is variable.

15. A method for manufacturing a harvesting machine, comprising:
- providing a chassis, a first rotor, a first cover element, a first concave, a second rotor, a second cover element, a second concave, a spine, and at least one threshing insert;
- rotationally coupling the first rotor to the chassis along a first axis;
- rotationally coupling the second rotor to the chassis along a second axis;
- coupling the spine to the chassis to structurally support the harvesting machine and so at least a portion of the spine is positioned between the first axis and the second axis;
- coupling at least one of the threshing inserts directly to a solid surface of the spine so the at least one threshing insert extends parallel with the first and second axis along a threshing section of the spine;
- coupling the first cover element and the first concave to the spine to partially define a first cavity for the first rotor; and
- coupling the second cover element and the second concave to the spine to partially define a second cavity for the second rotor;
- wherein, the threshing insert is configured to aid in a threshing process of the first or second rotor.

16. The method of claim 15, further comprising removeably coupling the at least one threshing insert to the spine with a fastener.

17. The method of claim 15, further comprising coupling more than one threshing insert to the spine.

18. The harvesting machine of claim 1, wherein the first cover element and first concave form a majority of a first circumference of the first cavity and the second cover element and the second concave form a majority of a second circumference of the second cavity.

19. The spine of claim 11, wherein the first cover element and first concave form a majority of a first circumference of the first cavity and the second cover element and the second concave form a majority of a second circumference of the second cavity.

* * * * *